(12) United States Patent
Moriwaki

(10) Patent No.: US 6,774,897 B2
(45) Date of Patent: Aug. 10, 2004

(54) APPARATUS AND METHOD FOR DRAWING THREE DIMENSIONAL GRAPHICS BY CONVERTING TWO DIMENSIONAL POLYGON DATA TO THREE DIMENSIONAL POLYGON DATA

(75) Inventor: Shohei Moriwaki, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 485 days.

(21) Appl. No.: 09/888,387

(22) Filed: Jun. 26, 2001

(65) Prior Publication Data

US 2002/0047841 A1 Apr. 25, 2002

(30) Foreign Application Priority Data

Oct. 19, 2000 (JP) ........................................ 2000-319199

(51) Int. Cl.⁷ ............................................. G06T 15/00
(52) U.S. Cl. ....................................................... 345/427
(58) Field of Search ................................ 345/419, 420, 345/421, 422, 423, 424, 426, 427, 428, 473, 619, 649, 653; 382/276, 285, 295, 296

(56) References Cited

U.S. PATENT DOCUMENTS

| | | | | |
|---|---|---|---|---|
| 5,124,693 A | * | 6/1992 | Himelstein et al. | ......... 345/427 |
| 5,687,307 A | * | 11/1997 | Akisada et al. | ............. 345/428 |
| 5,734,383 A | * | 3/1998 | Akimichi | ..................... 345/420 |
| 5,831,623 A | * | 11/1998 | Negishi et al. | ............. 345/424 |
| 5,999,185 A | * | 12/1999 | Kato et al. | ................... 345/420 |
| 6,083,162 A | * | 7/2000 | Vining | ......................... 600/407 |
| 6,411,292 B1 | * | 6/2002 | Cook et al. | .................. 345/419 |
| 6,456,287 B1 | * | 9/2002 | Kamen et al. | ............... 345/427 |
| 6,529,626 B1 | * | 3/2003 | Watanabe et al. | ........... 382/154 |
| 6,545,673 B1 | * | 4/2003 | Shiitani et al. | .............. 345/418 |

FOREIGN PATENT DOCUMENTS

| | | |
|---|---|---|
| JP | 5-89253 | 4/1993 |
| JP | 11-267126 | 10/1999 |

* cited by examiner

*Primary Examiner*—Mark Zimmerman
*Assistant Examiner*—Enrique L Santiago
(74) *Attorney, Agent, or Firm*—McDermott Will & Emery

(57) ABSTRACT

The 2D/3D converting unit converts two-dimensional (2D) polygon data to three-dimensional (3D) polygon data by substituting an X-coordinate value of the 2D polygon data for an X-coordinate value of the 3D polygon data, a Y-coordinate value of the 2D polygon data for a Z-coordinate value of the 3D polygon data, and a prescribed value for a Y-coordinate value of the 3D polygon data. The drawing unit draws three-dimensional graphics according to the 3D polygon data generated by the 2D/3D converting unit. Since the 2D/3D converting unit generates the 3D polygon data from the 2D polygon data solely by simple substitutions of the coordinate values, complicated operations are unnecessary for generation of the 3D polygon data. Thus, the three-dimensional graphics drawing apparatus is able to draw the three-dimensional graphics at high speed.

8 Claims, 5 Drawing Sheets

APPARATUS AND METHOD FOR DRAWING THREE DIMENSIONAL GRAPHICS BY CONVERTING TWO DIMENSIONAL POLYGON DATA TO THREE DIMENSIONAL POLYGON DATA

BACKGROUND OF THE INVENTION

1. Field of the Invention

The present invention relates to a technique for drawing three-dimensional graphics. More particularly, the present invention relates to an apparatus and a method for drawing three-dimensional graphics by converting two-dimensional polygon data to three-dimensional polygon data, and a recording medium having the three-dimensional polygon data recorded therein.

2. Description of the Background Art

Recently, in order to enable output of realistic and delicate images on a car navigation system and the like, three-dimensional graphics drawing apparatuses performing three-dimensional image processing at high speed have been increasingly utilized. In a conventional two-dimensional graphics drawing apparatus, two-dimensional graphics data is used which does not include Z-values as depth information. In the case where a three-dimensional graphics drawing apparatus is to use the two-dimensional graphics data as utilized in the conventional two-dimensional graphics drawing apparatus to draw three-dimensional graphics, operations including rotation of drawing object coordinates and others must be done to convert the two-dimensional graphics data to three-dimensional graphics data before being able to perform oblique projection as in a bird's-eye view.

Such operations for rotation of the drawing object coordinates and others, however, require a considerable amount of calculations, which decreases the drawing speed.

SUMMARY OF THE INVENTION

An object of the present invention is to provide an apparatus and a method for drawing three-dimensional graphics that allow high-speed conversion of two-dimensional polygon data to three-dimensional polygon data.

Another object of the present invention is to provide a recording medium that records three-dimensional polygon data generated from two-dimensional polygon data to allow a three-dimensional graphics drawing apparatus to draw three-dimensional graphics at high speed.

According to an aspect of the present invention, the three-dimensional graphics drawing apparatus includes: a converting unit that converts two-dimensional polygon data to three-dimensional polygon data by substituting an X-coordinate value of the two-dimensional polygon data for an X-coordinate value of the three-dimensional polygon data, substituting a Y-coordinate value of the two-dimensional polygon data for a Z-coordinate value of the three-dimensional polygon data, and substituting a prescribed value for a Y-coordinate value of the three-dimensional polygon data; and a drawing unit that draws three-dimensional graphics according to the three-dimensional polygon data generated by the converting unit.

Since the converting unit generates the three-dimensional polygon data from the two-dimensional polygon data exclusively by simple substitutions of the coordinate values, complicated operations become unnecessary for generation of the three-dimensional polygon data. Accordingly, the three-dimensional graphics drawing apparatus is able to draw the three-dimensional graphics at high speed.

According to another aspect of the present invention, the three-dimensional graphics drawing method includes: a step of converting two-dimensional polygon data to three-dimensional polygon data by substituting an X-coordinate value of the two-dimensional polygon data for an X-coordinate value of the three-dimensional polygon data, substituting a Y-coordinate value of the two-dimensional polygon data for a Z-coordinate value of the three-dimensional polygon data, and substituting a prescribed value for a Y-coordinate value of the three-dimensional polygon data; and a step of drawing three-dimensional graphics according to the generated three-dimensional polygon data.

Since the three-dimensional polygon data is generated from the two-dimensional polygon data only with simple substitutions of the coordinate values, complicated operations are unnecessary for generating the three-dimensional polygon data. Accordingly, it becomes possible to draw the three-dimensional graphics at high speed.

According to a further aspect of the present invention, the computer readable recording medium records three-dimensional polygon data generated from two-dimensional polygon data. The three-dimensional polygon data includes a plurality of three-dimensional polygon data, each of which has an X-coordinate value of the two-dimensional polygon data substituted for an X-coordinate value of the three-dimensional polygon data, a Y-coordinate value of the two-dimensional polygon data substituted for a Z-coordinate value of the three-dimensional polygon data, and a prescribed value substituted for a Y-coordinate value of the three-dimensional polygon data.

Accordingly, it becomes possible to use a conventional three-dimensional graphics drawing apparatus, without modification, to draw the three-dimensional graphics at high speed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
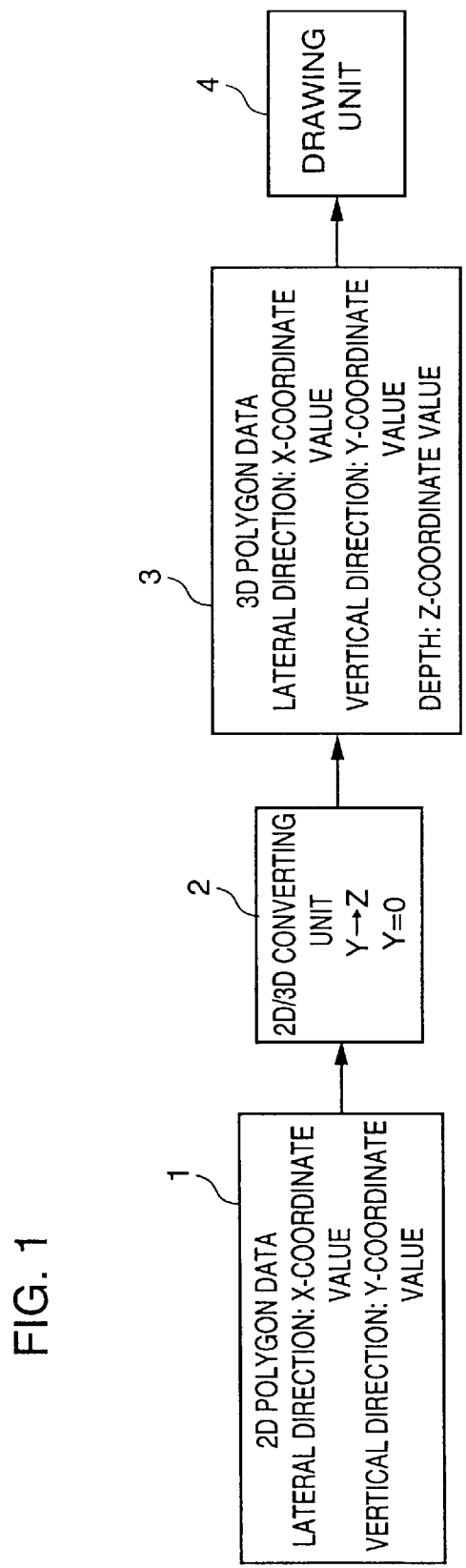
FIG. 1 is a block diagram showing a schematic configuration of a three-dimensional graphics drawing apparatus according to a first embodiment of the present invention.

Referring to FIG. 1, the three-dimensional graphics drawing apparatus according to the first embodiment includes: a 2D/3D converting unit 2 that converts two-dimensional (2D) polygon data 1 to three-dimensional (3D) polygon data 3; and a drawing unit 4 that draws three-dimensional polygons based on the three-dimensional polygon data 3 generated by 2D/3D converting unit 2.

Two-dimensional polygon data 1 is defined by an X-coordinate value and a Y-coordinate value, and does not have a Z-value representing the depth information. 2D/3D converting unit 2 substitutes the Y-coordinate value of two-dimensional polygon data 1 for a Z-coordinate value of three-dimensional polygon data 3 to represent its depth, and substitutes "0" for a Y-coordinate value of three-dimensional polygon data 3. The X-coordinate value of two-dimensional polygon data 1 is employed as an X-coordinate value of three-dimensional polygon data 3 without alteration.

Figure 2:
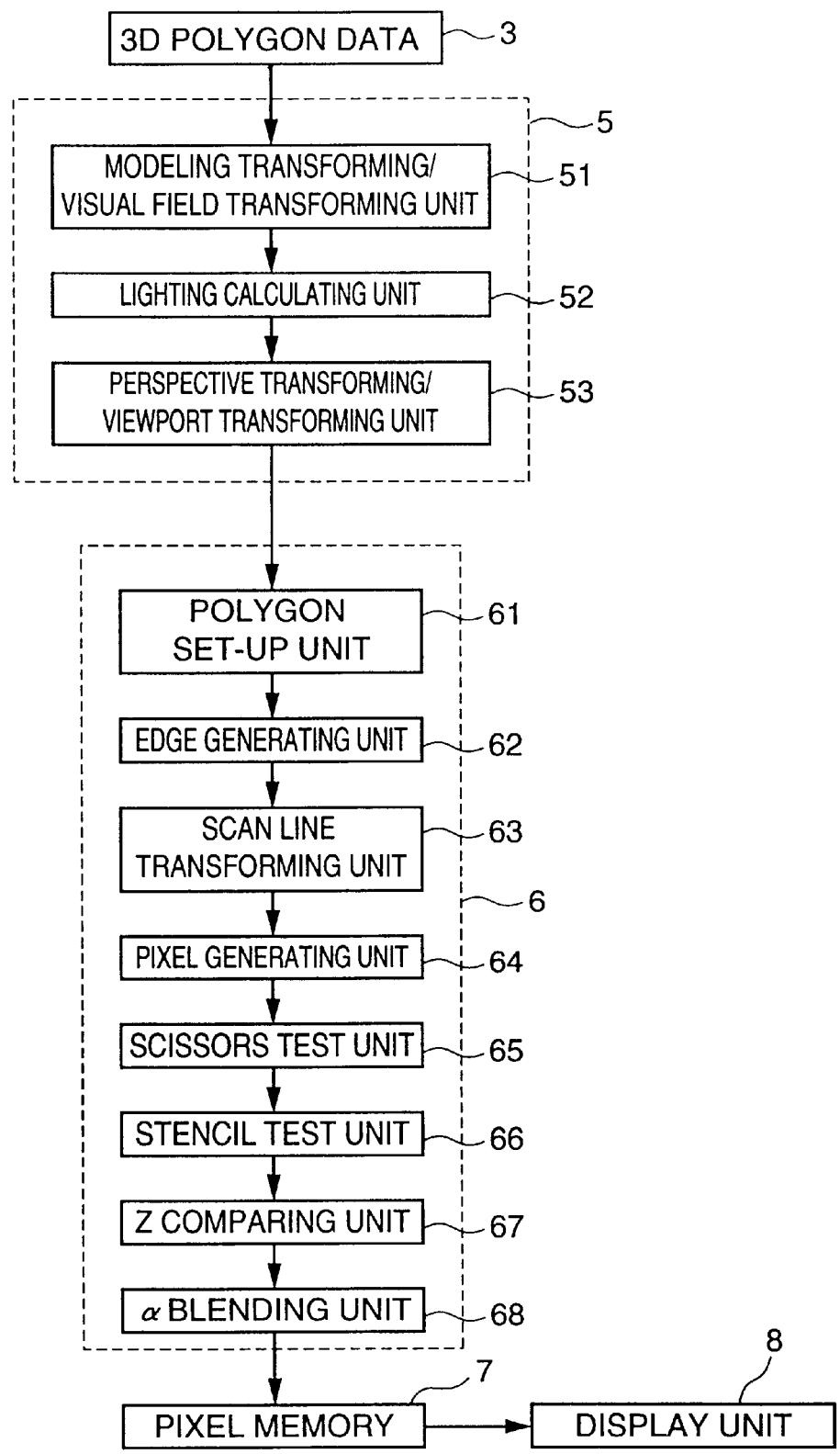
FIG. 2 is a block diagram illustrating a detailed configuration of the drawing unit 4 in FIG. 1.

Referring to FIG. 2, drawing unit 4 shown in FIG. 1 includes: a geometrical operation unit 5 that performs a series of geometrical operations on three-dimensional polygon data 3; a three-dimensional drawing unit 6 that performs a series of drawing processes based on vertex data which was operated and output from geometrical operation unit 5; a pixel memory 7 that stores pixel data generated by three-dimensional drawing unit 6, as a frame image; and a display unit 8 that displays the pixel data stored in pixel memory 7.

Geometrical operation unit 5 performs geometrical operations on three-dimensional polygon data 3, and provides coordinate-transformed vertex data of each polygon constituting a primitive, e.g., vertex coordinate data, onto a viewport.

Three-dimensional drawing unit 6 generates pixel data of each polygon constituting the primitive based on the vertex coordinate data output from geometrical operation unit 5, and writes the generated pixel data to pixel memory 7. At a time when the pixel data corresponding to one frame has been written into pixel memory 7 by three-dimensional drawing unit 6, display unit 8 reads the relevant pixel data out of pixel memory 7, and displays the data successively.

Geometrical operation unit 5 includes: a modeling transforming/visual field transforming unit 51 that performs modeling transformation by first defining a three-dimensional shape to be drawn in a modeling coordinate system and transforming the three-dimensional shape defined in the modeling coordinate system into that in a world coordinate system so that the shape is arranged in a space, and further performs visual field transformation by determining projection conditions for the three-dimensional shape, including a position of view point and a direction of visual line, so that the three-dimensional shape is arranged in a visual area; a lighting calculating unit 52 that calculates brightness of lighting of the three-dimensional shape having been modeling-transformed and visual field-transformed by modeling transforming/visual field transforming unit 51; and a perspective transforming/viewport transforming unit 53 that performs perspective transformation of the three-dimensional shape as an object and transforms the visual area to a viewport.

Three-dimensional drawing unit 6 includes: a polygon set-up unit 61 that calculates a difference of vertex coordinates of a polygon and outputs an inclination between vertexes of the polygon; an edge generating unit 62 that refers to the inclination between the vertexes of the polygon output from polygon set-up unit 61 to generate an edge between the vertexes of the polygon; a scan line transforming unit 63 that transforms each polygon pixel by pixel, based on the edge of the polygon generated by edge generating unit 62; a pixel generating unit 64 that generates pixel data in each polygon; a scissors test unit 65 that deletes pixels out of range of a display frame; a stencil test unit 66 that determines whether each pixel is an object of drawing; a Z comparing unit 67 that compares Z values of the polygon to determine whether the polygon is to be drawn on the display image plane; and an α blending unit 68 that refers to an α value representing degree of transparency to synthesize color data of succeeding polygons.

Figure 3A:
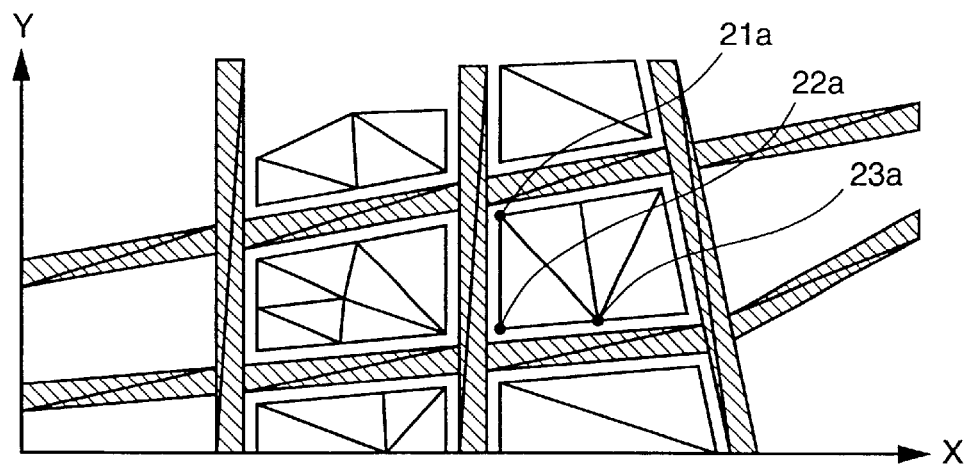
FIGS. 3A and 3B illustrate how three-dimensional polygons are drawn by the three-dimensional graphics drawing apparatus according to the first embodiment of the present invention.
Figure 3B:
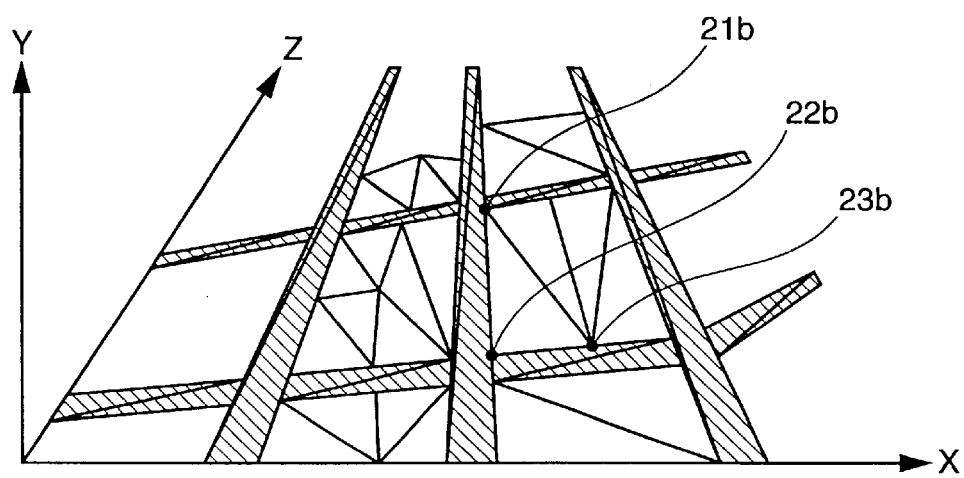

FIGS. 3A and 3B illustrate how three-dimensional polygon data generated from two-dimensional polygon data is displayed. FIG. 3A shows two-dimensional polygon data displayed without alteration, where each polygon is displayed based on the X-coordinate value and the Y-coordinate value. FIG. 3B shows the two-dimensional polygon data displayed on a plane in a three-dimensional space. As seen from FIG. 3B, the position information in a lateral direction is represented by the X-coordinate values; the position information in a depth direction is represented by the Z-coordinate values; and the Y-coordinate value representing the position information in a height direction is set to "0".

Thus, by performing the transformations explained above, the two-dimensional polygon data is converted to the three-dimensional polygon data. Drawing unit 4 then draws three-dimensional polygons according to the obtained three-dimensional polygon data, so that display of the three-dimensional polygons as shown in FIG. 3B is accomplished. Coordinate values 21a, 22a and 23a of the two-dimensional polygon data in FIG. 3A are respectively converted to coordinate values 21b, 22b and 23b of the three-dimensional polygon data in FIG. 3B. Although "0" has been substituted for the Y-coordinate value of the three-dimensional polygon data in the description above, any other prescribed value may be substituted therefor.

As explained above, according to the three-dimensional graphics drawing apparatus of the present embodiment, 2D/3D converting unit 2 converts two-dimensional polygon data to three-dimensional polygon data. Thus, it becomes possible for three-dimensional drawing unit 4 to draw three-dimensional polygons with ease. In addition, 2D/3D converting unit 2 generates the three-dimensional polygon data by substituting the Y-coordinate value of two-dimensional polygon data 1 for its Z-coordinate value to represent the depth and substituting "0" for its Y-coordinate value. This makes complicated operations unnecessary, so that the processing speed of the three-dimensional graphics drawing apparatus increases.

Second Embodiment

Figure 4:
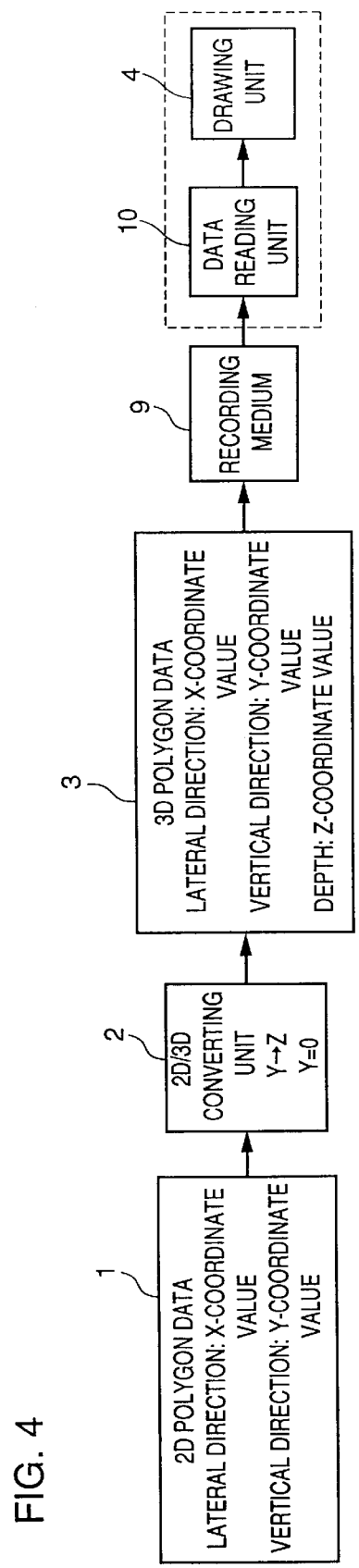
FIG. 4 is a block diagram showing a schematic configuration of a three-dimensional graphics drawing apparatus according to a second embodiment of the present invention.

Referring to FIG. 4, the three-dimensional graphics drawing apparatus according to the second embodiment includes: a data reading unit 10 that reads three-dimensional polygon data 3 out of a recording medium 9; and a drawing unit 4 that draws three-dimensional polygons according to the three-dimensional polygon data read by data reading unit 10. Drawing unit 4 of the present embodiment is identical to that of the first embodiment, so that detailed description thereof is not repeated.

2D/3D converting unit 2 converts two-dimensional polygon data 1 to three-dimensional polygon data 3 and records the data 3 in recording medium 9. Recording medium 9 includes a compact disc-read only memory (CD-ROM), a magneto-optical disk, a memory card and the like. Data reading unit 10 is a mechanism for reading the three-dimensional polygon data out of recording medium 9, which, e.g., corresponds to a CD-ROM drive if recording medium 9 is a CD-ROM. It is needless to say that recording medium 9 may be manufactured and placed on the market separately from the three-dimensional graphics drawing apparatus.

As explained above, according to the three-dimensional graphics drawing apparatus of the present embodiment, 2D/3D converting unit 2 converts two-dimensional polygon data 1 to three-dimensional polygon data 3 and records the data 3 in recording medium 9. This makes it unnecessary to perform complicated operations for generating the three-dimensional polygon data. Accordingly, it becomes possible to increase the processing speed of the three-dimensional graphics drawing apparatus. In addition, a conventional three-dimensional graphics drawing apparatus can be used, without any modification, for high-speed drawing of the three-dimensional graphics.

Third Embodiment

Figure 5:
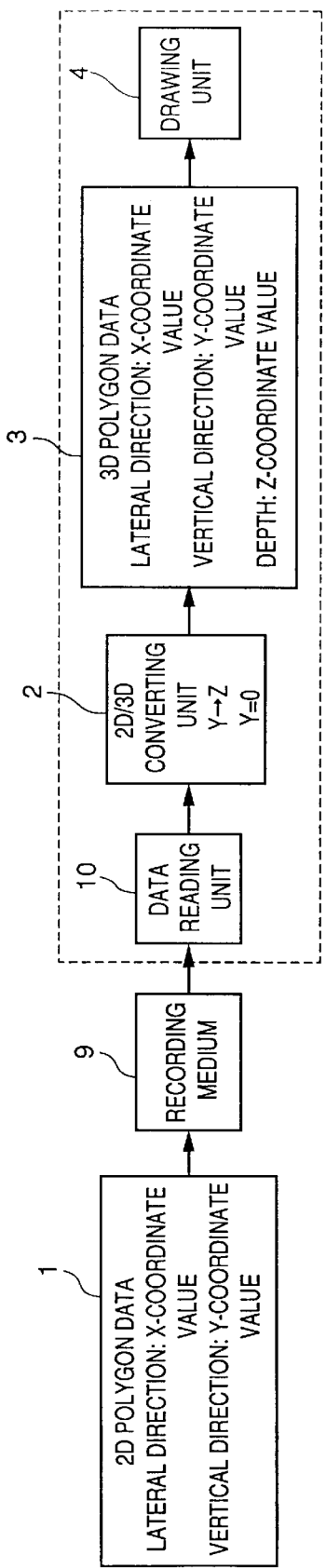
FIG. 5 is a block diagram showing a schematic configuration of a three-dimensional graphics drawing apparatus according to a third embodiment of the present invention.

Referring to FIG. 5, the three-dimensional graphics drawing apparatus according to the third embodiment includes: a data reading unit 10 that reads two-dimensional polygon data 1 out of recording medium 9; a 2D/3D converting unit 2 that converts two-dimensional polygon data 1 read by data reading unit 10 to three-dimensional polygon data 3; and a drawing unit 4 that draws three-dimensional polygons according to three-dimensional polygon data 3. Drawing unit 4 of the present embodiment is identical to that of the first embodiment, and therefore, detailed description thereof is not repeated.

2D/3D converting unit 2 converts two-dimensional polygon data 1 that was read by data reading unit 10 to three-dimensional polygon data 3, and outputs the data 3 to drawing unit 4. Recording medium 9 includes a CD-ROM, a magneto-optical disk, a memory card and the like. Data reading unit 10 is a mechanism for reading the three-dimensional polygon data out of recording medium 9, which, e.g., is a CD-ROM drive if recording medium 9 is the CD-ROM. Recording medium 9 corresponds to a conventional recording medium in which two-dimensional polygon data has been recorded.

As explained above, according to the three-dimensional graphics drawing apparatus of the present embodiment, 2D/3D converting unit 2 converts two-dimensional polygon data 1 to three-dimensional polygon data 3 and outputs the data 3 to drawing unit 4. This makes complicated operations unnecessary for generation of the three-dimensional polygon data, and thus, the processing speed of the three-dimensional graphics drawing apparatus increases. In addition, since data reading unit 10 reads the two-dimensional polygon data recorded in recording medium 9, it is possible to use a conventional recording medium having the two-dimensional polygon data recorded therein, without any modification.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional graphics drawing apparatus, comprising:
    a converting unit converting two-dimensional polygon data to three-dimensional polygon data by substituting an X-coordinate value of the two-dimensional polygon data for an X-coordinate value of the three-dimensional polygon data, substituting a Y-coordinate value of the two-dimensional polygon data for a Z-coordinate value of the three-dimensional polygon data, and substituting a prescribed value for a Y-coordinate value of the three-dimensional polygon data; and
    a drawing unit drawing three-dimensional graphics according to the three-dimensional polygon data obtained by said converting unit.

2. The three-dimensional graphics drawing apparatus according to claim 1, wherein
    said drawing unit includes
    a geometrical operation unit that generates vertex data of a three-dimensional polygon, and
    a three-dimensional drawing unit that draws said three-dimensional polygon based on the vertex data of the three-dimensional polygon generated by said geometrical operation unit.

3. The three-dimensional graphics drawing apparatus according to claim 1, further comprising:
    a reading unit reading said two-dimensional polygon data recorded in a recording medium and outputting the read data to said converting unit.

4. The three-dimensional graphics drawing apparatus according to claim 3, wherein
    said drawing unit includes
    a geometrical operation unit that generates vertex data of a three-dimensional polygon, and
    a three-dimensional drawing unit that draws said three-dimensional polygon based on the vertex data of the three-dimensional polygon generated by said geometrical operation unit.

5. A three-dimensional graphics drawing method, comprising the steps of:
    converting two-dimensional polygon data to three-dimensional polygon data by substituting an X-coordinate value of the two-dimensional polygon data for an X-coordinate value of the three-dimensional polygon data, substituting a Y-coordinate value of the two-dimensional polygon data for a Z-coordinate value of the three-dimensional polygon data and substituting a prescribed value for a Y-coordinate value of the three-dimensional polygon data; and
    drawing three-dimensional graphics according to said three-dimensional polygon data obtained.

6. The three-dimensional graphics drawing method according to claim 5, wherein
    said step of drawing the three-dimensional graphics includes the steps of
    generating vertex data of a three-dimensional polygon, and
    drawing said three-dimensional polygon based on said generated vertex data of the three-dimensional polygon.

7. The three-dimensional graphics drawing method according to claim 5, further comprising the step of
    reading said two-dimensional polygon data recorded in a recording medium prior to said converting step.

8. The three-dimensional graphics drawing method according to claim 7, wherein
    said step of drawing the three-dimensional graphics includes the steps of
    generating vertex data of a three-dimensional polygon, and
    drawing said three-dimensional polygon based on said generated vertex data of the three-dimensional polygon.

* * * * *